United States Patent [19]
Burrous et al.

[11] 3,714,356
[45] Jan. 30, 1973

[54] ANTIBACTERIAL COMPOSITION AND METHOD

[75] Inventors: Stanley E. Burrous; William W. Eudy; Arthur J. Siedler, all of Norwich, N.Y.

[73] Assignee: Morton-Norwich Products, Inc.

[22] Filed: Jan. 18, 1971

[21] Appl. No.: 107,518

[52] U.S. Cl. ................424/271, 424/317, 424/319
[51] Int. Cl. .............................................A61k 21/00
[58] Field of Search......................424/271, 317, 319

[56] References Cited
OTHER PUBLICATIONS

The Merck Index, 8th Edition, 1968, pages 75 and 397.

Primary Examiner—Jerome D. Goldberg
Attorney—Bradford S. Allen

[57] ABSTRACT

An antimicrobial composition consisting of ampicillin and L-3-(3,4-dihydroxyphenyl)alanine or 3,4-dihydroxyphenylacetic acid is more efficacious than ampicillin alone in the treatment of pyelonephritis.

2 Claims, No Drawings

ANTIBACTERIAL COMPOSITION AND METHOD

This invention relates to antimicrobial therapy. More particularly it is concerned with antimicrobial therapy through a composition consisting of ampicillin and L-3-(3,4-dihydroxyphenyl)alanine (levodopa) or 3,4-dihydroxyphenylacetic acid (dopac).

Ampicillin is a valuable anti-infective agent. However, in keeping with most therapeutic agents, side effects are oftentimes encountered. One side effect associated with ampicillin therapy is diarrhea which is noted in both animals, such as the rat, and humans. In the latter, this side effect sometimes approaches such severity that valuable therapy must be withdrawn.

We have discovered that the dosage of ampicillin necessary to achieve therapeutic results can be markedly reduced through the concomitant administration of ampicillin and levodopa or dopac. Such potentiation affords a continuance of therapy in the side effect susceptible host and thus greater latitude of therapy with lesser risk of inducing unwanted side effects.

In accordance with this invention pyelonephritis is produced in one kidney of the rat by inoculation of that organ with a saline suspension of a culture of *Escherichia coli*, the other serving as control. After infection of the kidney had been established, the organ was removed by excision and examined for viable bacteria either by brain-heart agar plate count or by an Aminco automatic diluter. This method of infecting rat kidneys and determining infectivity is more fully described in Applied Microbiology, Sept. 1969, p. 448–451.

Ampicillin administered by gavage, perorally, in a 1 percent sodium carboxymethylcellulose suspension at a dose of 20 mg/kg b.i.d. to so infected rats achieved only marginal therapeutic benefit. Neither levodopa nor dopac similarly administered in doses varying from 40–100 mg/kg evinced any therapeutic benefit. When ampicillin at the borderline effective dose of 20 mg/kg and from 40–100 mg/kg of levodopa or dopac were similarly administered together a surprising reduction of viable bacteria was effected. A lower dose of ampicillin of 7 mg/kg in conjunction with a 100 mg/kg amount of levodopa also produced results not attributable to either alone. The table herebelow depicts the results achieved:

Titers of Viable Bacteria in Rat Unilateral *Escherichia coli* Pyelonephritis

Oral, b.i.d., Therapy commencing 3 days after infection and continuing for 14 days.

| Exp. | No. of rats | Compound | Dose, mg/kg | $Log_{10}$ of geometric mean of viable bacterial titers of 5 or 10 kidneys |
|---|---|---|---|---|
| 1 | 10 | control | — | 4.7 |
|  | 10 | ampicillin | 20 | 4.4 |
|  | 10 | levodopa | 40 | 4.3 |
|  | 10 | levodopa + ampicillin | 40 20 | 2.8 |
| 2 | 5 | Control | — | 4.3 |
|  | 5 | ampicillin | 20 | 3.3 |
|  | 5 | levodopa | 100 | 4.2 |
|  | 5 | ampicillin + levodopa | 20 100 | 2.5 |
| 3 | 10 | Control | — | 4.8 |
|  | 10 | ampicillin | 20 | 3.9 |
|  | 10 | dopac | 40 | 4.8 |
|  | 10 | ampicillin + dopac | 20 40 | 3.1 |
| 4 | 10 | Control | — | 4.8 |
|  | 10 | ampicillin | 7 | 3.8 |
|  | 10 | levodopa | 100 | 4.0 |
|  | 10 | ampicillin + levodopa | 7 100 | 3.3 |

What is claimed is:

1. A potentiated antibacterial composition consisting of ampicillin and L-3-(3,4-dihydroxyphenyl) alanine or 3,4-dihydroxyphenylacetic acid in the proportion of from 1:2 to 1:5.

2. A method for treating bacterial infections in an animal which comprises orally administering to said animal an antibacterially effective amount of the composition as define in claim 1.

* * * * *